No. 811,041.                                          PATENTED JAN. 30, 1906.
J. E. DOBSON.
CLUTCH.
APPLICATION FILED JUNE 27, 1904.
2 SHEETS—SHEET 1.
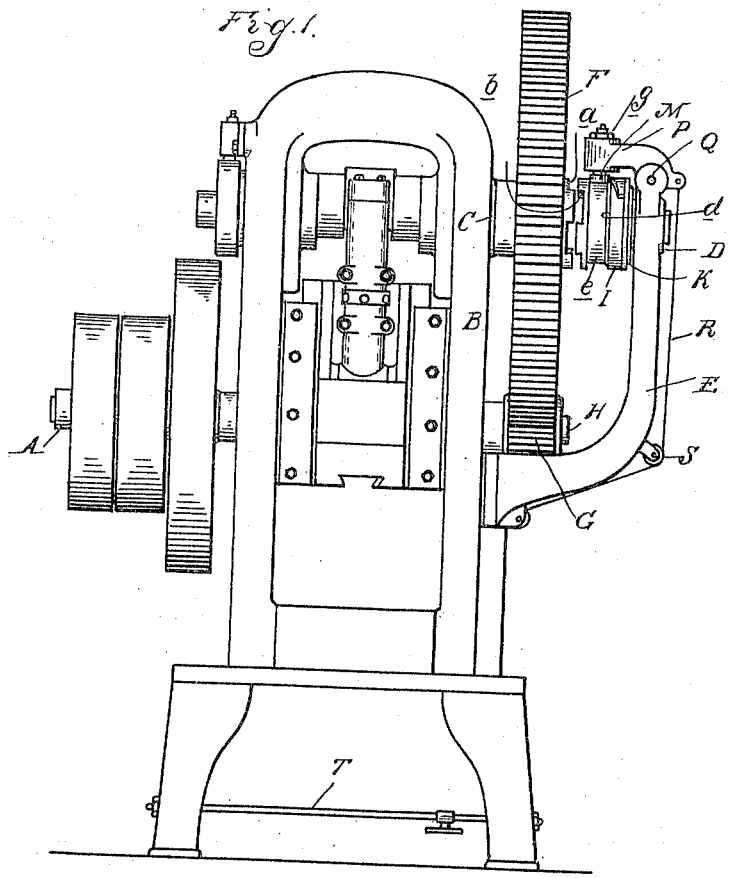
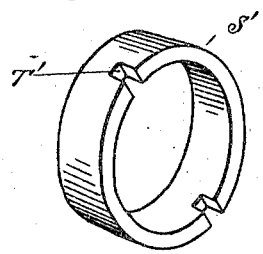
Witnesses
Jas. P. Barry
E. D. Ault
Inventor
John E. Dobson
By
James Whittemore
atty.

No. 811,041.  
PATENTED JAN. 30, 1906.  
J. E. DOBSON.  
CLUTCH.  
APPLICATION FILED JUNE 27, 1904.
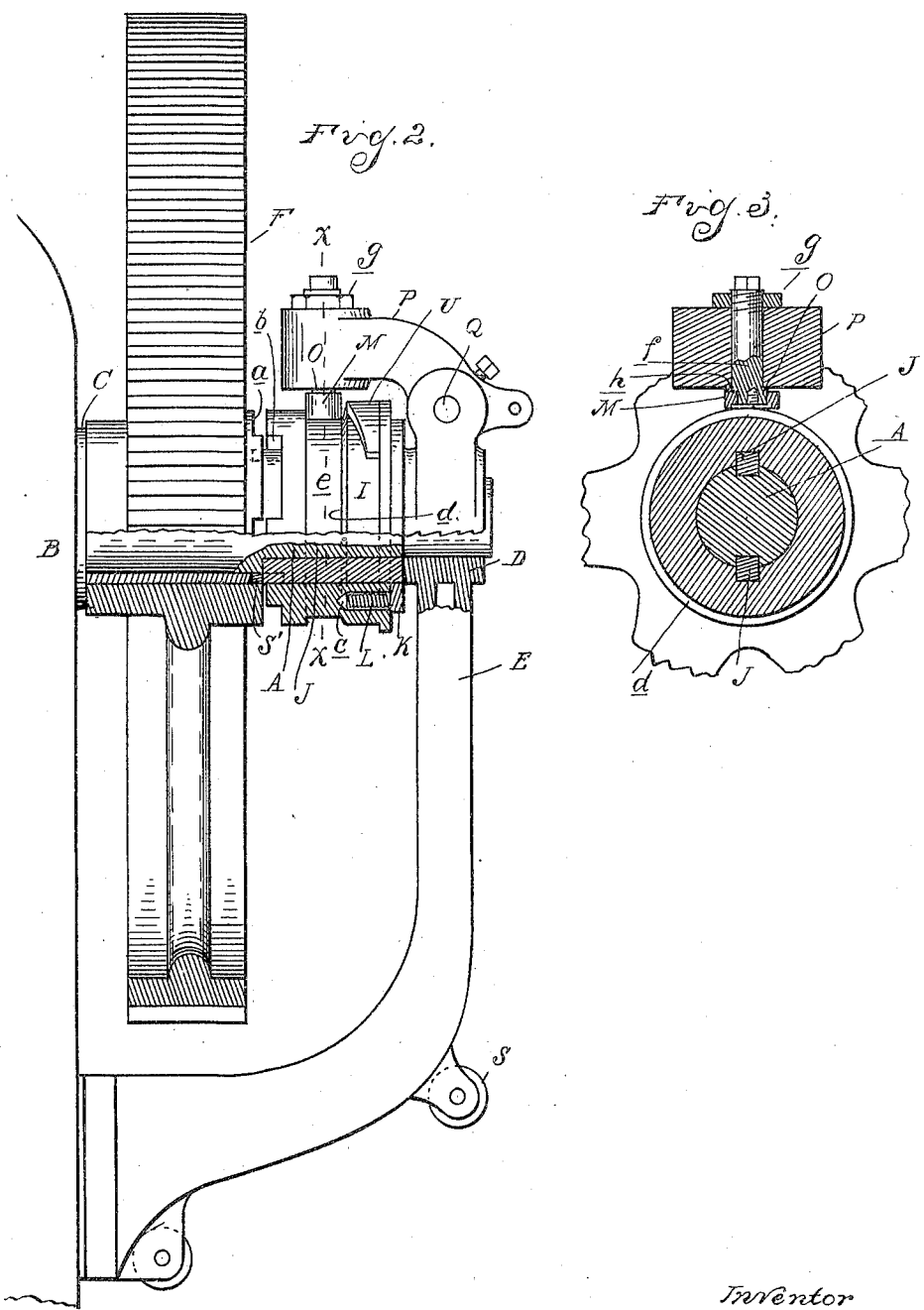
Witnesses  
Jas. P. Barry  
E. D. Ault
Inventor  
John E. Dobson  
By James Whittemore  
Atty.

UNITED STATES PATENT OFFICE.

JOHN E. DOBSON, OF YPSILANTI, MICHIGAN, ASSIGNOR TO MICHIGAN MACHINERY MNFG. COMPANY, OF YPSILANTI, MICHIGAN, A CORPORATION OF MICHIGAN.

CLUTCH.

No. 811,041.　　　　Specification of Letters Patent.　　　　Patented Jan. 30, 1906.

Application filed June 27, 1904. Serial No. 214,305.

*To all whom it may concern:*

Be it known that I, JOHN E. DOBSON, a citizen of the United States, residing at Ypsilanti, in the county of Washtenaw and State of Michigan, have invented certain new and useful Improvements in Clutches, of which the following is a specification, reference being had therein to the accompanying drawings.

The invention relates to clutches of that type adapted to automatically disengage after a predetermined movement, such as a single rotation of a shaft; and the invention consists in the construction as hereinafter set forth.

In the drawings, Figure 1 is an elevation of a press provided with my form of clutch. Fig. 2 is a sectional elevation of the clutch. Fig. 3 is a cross-section on line $xx$, Fig. 2; and Fig. 4 is a sectional perspective view illustrating the ring on the shaft which acts as a stop for the gear-wheel to prevent endwise movement thereof.

A is a shaft constituting the member to be driven during the engagement of the clutch. This shaft is journaled in suitable bearings, such as the frame B of the press, one bearing C being formed in the main portion of the frame and the second bearing D being formed by a bracket E, which is secured to the frame. F is a drive member which, as shown, is in the form of a gear-wheel sleeved upon the shaft A adjacent to the bearing C and in permanent mesh with the pinion G upon the outer shaft H.

The hub of the gear-wheel F constitutes one member of the clutch and to this end is provided with a notched or shouldered face $a$. The coöperating clutch member is formed by a sleeve I on the shaft A between the gear-wheel F and the bearing D. This sleeve is provided with a complementary notched or shouldered face $b$ and is secured to the shaft A so as to be free to slide longitudinally thereon, but compelled to rotate therewith, by means of the feathers J.

K is a collar upon the shaft A adjacent to the bearing D and coupled to the shaft by the feathers J.

L represents springs arranged in recesses $c$ formed in the sleeve I and bearing against the collar K, the tension of said springs being exerted to move the sleeve toward the gear-wheel F to cause the engagement of the shouldered faces $a$ and $b$. The sleeve I is normally held in disengaged position by a member M, which engages a peripheral groove $d$ in the sleeve and holds the latter from longitudinal movement on the shaft. The member M is preferably in the form of an antifriction-roll journaled upon a bearing O, secured to a rock-arm P, said rock-arm being pivotally secured at Q to the bearing D. The rock-arm D is actuated by suitable connections, such as the cord R, passing over the sheaves S and connecting to the foot-lever T, the arrangement being such that by depressing the foot-lever the arm P is rocked so as to carry the antifriction-roll M out of engagement with the groove $d$ and permit the sleeve I to be actuated by the springs L, so as to engage the shoulder-faces $a$ and $b$.

For automatically releasing the clutch a cam U is provided on the periphery of the sleeve I in the path of the roll M after the rock-arm P has been released by the return of the foot-lever T. Thus as soon as pressure on the foot-lever is relieved the arm P will be returned by gravity to a position where the roll M rests upon the annular portion $e$ of the sleeve I adjacent to the groove $d$. In this position the completion of one revolution of the sleeve will cause the cam U to engage with the roll M, with the result that the sleeve will be drawn out of engagement with the gear-wheel F and into a position where the roll M can again enter the groove $d$ to completely disengage the clutch. The face of the groove $d$, which contacts with the roll M, is slightly beveled, so that the inward movement of the roll would cause the further actuation of the sleeve to give the necessary clearance from the gear-wheel F.

To compensate for any wear, the roll M is adjustable upon the rock-arm P, preferably by forming the journal O upon a pin, the shank $f$ of which is eccentric to the journal and passes through an aperture in the arm P, being clamped by a nut $g$ engaging the threaded end of the shank $f$. With this construction whenever the nut $g$ is released the shank $f$ may be partly rotated in its socket, which will result in adjusting the journal O in relation to the arm P. The nut $g$ will then be tightened, which will draw the shank $f$ and the shoulder $h$ thereon against the arm P, firmly clamping the parts from movement.

As the sleeve I is withdrawn from engagement with the hub of the gear-wheel F the friction of the contacting parts would tend to draw the gear-wheel longitudinally on the shaft, and to prevent this I place on the shaft between the hub of the gear-wheel and the ends of the keys or feathers J the ring S'. This ring is provided with the notches T', in which engage the ends of the feathers or keys J, so as to prevent a rotary motion of the ring S' upon the shaft.

What I claim as my invention is—

1. A clutch comprising a shaft, a pair of separated bearings in which said shaft is journaled and in fixed relation to each other, coöperating clutch members sleeved on said shaft between said bearings, one of said bearings being revoluble and the other longitudinally slidable upon said shaft, a spring between said slidable member and its adjacent bearing, a peripheral cam on said slidable member, and a rock-arm having means rigidly secured thereto for engaging with said cam to cause the longitudinal movement of said slidable member against the tension of said spring and out of engagement with the coöperating clutch member.

2. A clutch comprising a shaft, a pair of separated bearings in which said shaft is journaled, said bearings being in fixed relation to each other, a driven wheel sleeved upon said shaft adjacent to one bearing, a sleeve feathered to said shaft between said driven wheel and the other bearing, coöperating clutch-faces on said sleeve, a driven wheel, a spring between said sleeve and its adjacent bearing for yieldingly pressing the former into engagement with said driven wheel, a peripheral cam on said sleeve, and a gravity rock-arm having means rigidly secured thereto for engaging with said cam to cause the latter to disengage said sleeve from said driven wheel.

3. In a clutch, the combination with the driven wheel of a shaft on which said wheel is journaled, a sleeve feathered to said shaft and together with said driven wheel forming coöperating clutch members, a tension device for moving said sleeve toward said driven wheel, a peripheral cam on said sleeve, and a gravity rock-arm having means rigidly secured thereto for engagement with said peripheral cam to disengage said clutch members.

4. In a clutch, the combination with a revoluble clutch member and a coöperating slidable clutch member, of a peripheral cam on said slidable member, a rock-arm, an anti-friction-roll, a bearing for said roll rigidly connected to said rock-arm, whereby the same will rock therewith and engage said cam.

5. In a clutch, the combination with a revoluble clutch member of a coöperating slidable clutch member, a peripheral cam on said slidable member, the rock-arm P, the anti-friction-roll M, adjustably secured thereto the journal O having the eccentric shank $f$ and clamping means for said shank in different positions of adjustment.

6. The combination of the driving-shaft of the gear-wheel loose thereon and having a toothed hub forming one member of a clutch, of the toothed sleeve feathered to the shaft forming the other member of the clutch, and the ring S' between the ends of the feathers and the hub of the wheel, and the notches T' in said ring engaging the end of the feathers or keys, as and for the purpose described.

7. A clutch for presses or the like comprising a frame, a shaft extending outwardly therefrom, a pair of separated bearings in which said shaft is journaled, an upwardly-extended bracket on the frame for the outer bearing, a driven wheel sleeved upon said shaft adjacent the inner bearing, a sleeve feathered to said shaft between said driven wheel and the outer bearing, coöperating clutch-faces on said sleeve and driven wheel, a peripheral cam on said sleeve, and a gravity rock-arm pivoted to the upper end of the said bracket, one end thereof being free and having means rigidly secured thereto for engaging said cam to cause the latter to disengage said sleeve from said driven wheel.

8. A clutch of the character described comprising a driven wheel and a sleeve, a shaft for said wheel and sleeve, coöperating clutch-faces on said sleeve and driven wheel, a peripheral cam on said sleeve and a gravity rock-arm pivoted adjacent one end only to a relatively fixed member, the opposite end of said arm being free to move by gravity and having means connected thereto and movable therewith for engaging said cam to cause the latter to disengage said sleeve from said driven wheel.

In testimony whereof I affix my signature in presence of two witnesses.

JOHN E. DOBSON.

Witnesses:
  H. C. SMITH,
  EDWARD AULT.